United States Patent

(12) United States Patent
Jang et al.

(10) Patent No.: US 11,804,230 B2
(45) Date of Patent: Oct. 31, 2023

(54) AUDIO ENCODING/DECODING APPARATUS AND METHOD USING VECTOR QUANTIZED RESIDUAL ERROR FEATURE

(71) Applicants: ELECTRONICS AND TELECOMMUNICATIONS RESEARCH INSTITUTE, Daejeon (KR); Gwangju Institute of Science and Technology, Gwangju (KR)

(72) Inventors: Inseon Jang, Daejeon (KR); Seung Kwon Beack, Daejeon (KR); Jongmo Sung, Daejeon (KR); Tae Jin Lee, Daejeon (KR); Woo-taek Lim, Daejeon (KR); Jongwon Shin, Gwangju (KR); Youngju Cheon, Gwangju (KR); Sangwook Han, Gwangju (KR); Soojoong Hwang, Gwangju (KR)

(73) Assignees: Electronics and Telecommunications Research Institute, Daejeon (KR); Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 17/711,908

(22) Filed: Apr. 1, 2022

(65) Prior Publication Data
US 2023/0039546 A1 Feb. 9, 2023

(30) Foreign Application Priority Data

Jul. 30, 2021 (KR) .......................... 10-2021-0100809

(51) Int. Cl.
G10L 19/02 (2013.01)
G10L 19/038 (2013.01)
G06N 3/04 (2023.01)

(52) U.S. Cl.
CPC .............. *G10L 19/038* (2013.01); *G06N 3/04* (2013.01); *G10L 19/02* (2013.01)

(58) Field of Classification Search
CPC .......................... G10L 19/02; G10L 19/0212
See application file for complete search history.

(56) References Cited

U.S. PATENT DOCUMENTS 5,630,011 A * 5/1997 Lim .................... G10L 21/0364
704/E21.009
6,459,914 B1 * 10/2002 Gustafsson ......... G10L 21/0232
704/226

(Continued)

FOREIGN PATENT DOCUMENTS

KR 101413968 B1 7/2014

OTHER PUBLICATIONS

Florin Ghido et al., "Coding of fine granular audio signals using High Resolution Envelope Processing (HREP)," ICASSP 2017, 2017, pp. 701-705, IEEE.

(Continued)

*Primary Examiner* — Feng-Tzer Tzeng

(57) ABSTRACT

An audio encoding/decoding apparatus and method using vector quantized residual error features are disclosed. An audio signal encoding method includes outputting a bitstream of a main codec by encoding an original signal, decoding the bitstream of the main codec, determining a residual error feature vector from a feature vector of a decoded signal and a feature vector of the original signal, and outputting a bitstream of additional information by encoding the residual error feature vector.

12 Claims, 7 Drawing Sheets

(56) References Cited

U.S. PATENT DOCUMENTS

| | | |
|---|---|---|
| 2020/0135220 A1 | 4/2020 | Lee et al. |
| 2021/0005208 A1 | 1/2021 | Beack et al. |
| 2021/0174815 A1 | 6/2021 | Beack et al. |

OTHER PUBLICATIONS

Arijit Biswas et al., "Temporal Noise Shaping with Companding," INTERSPEECH, 2018, pp. 3548-3552.

\* cited by examiner

| Bitrate | NeroAAC | +PP only | Prop. (+0.6kbps) |
|---|---|---|---|
| 10 kbps | 1.92 | 2.31 | 3.13 |
| 12 kbps | 2.06 | 2.56 | 3.32 |
| 16 kbps | 2.34 | 2.89 | 3.55 |
| 20 kbps | 2.53 | 3.11 | 3.68 |
| 24 kbps | 2.72 | 3.30 | 3.84 |

| Bitrate | QAAC | +PP only | Prop. (+0.6kbps) |
|---|---|---|---|
| 10 kbps | 1.89 | 2.46 | 2.92 |
| 12 kbps | 2.03 | 2.69 | 3.18 |
| 16 kbps | 2.53 | 3.04 | 3.62 |
| 20 kbps | 2.89 | 3.39 | 3.85 |
| 24 kbps | 3.09 | 3.54 | 4.00 |

FIG. 3

AUDIO ENCODING/DECODING APPARATUS AND METHOD USING VECTOR QUANTIZED RESIDUAL ERROR FEATURE

CROSS-REFERENCE TO RELATED APPLICATION

This application claims the benefit of Korean Patent Application No. 10-2021-0100809 filed on Jul. 30, 2021, in the Korean Intellectual Property Office, the entire disclosure of which is incorporated herein by reference for all purposes.

BACKGROUND

1. Field of the Invention

One or more example embodiments relate to an apparatus and method for improving coding sound quality by compressing a vector quantized residual error feature with a neural network and using it as additional information.

2. Description of the Related Art

In the case that an audio coding technology operates at a low bit rate, coding artifacts such as pre-echo and quantization noise may occur, which may degrade audio quality. Various pre/post-processing techniques are being developed to improve sound quality by removing these coding artifacts.

An audio coding method of Ghido, Florin, et al. "Coding of fine granular audio signals using High Resolution Envelope Processing (HREP)." 2017 IEEE International Conference on Acoustics, Speech and Signal Processing (ICASSP). IEEE, 2017 is a method of improving sound quality by using a gain value of a high-frequency component of a signal as additional information. This method detects a transient signal in which pre-echo may occur, flattens an envelope, and returns the flattened component to the original component using transmitted additional information at the decoding stage.

Coding sound quality improvement techniques according to a related art using additional information have limitations in limiting a sound quality improvement range because the additional information is limited to the presence or absence of a voice, the presence or absence of a transient signal, of a gain value of a signal in a time-frequency domain.

Accordingly, there is a need for a method for improving sound quality of audio coding without limiting the sound quality improvement range.

SUMMARY

Example embodiments provide an audio encoding apparatus for encoding residual error features using a neural network, vector quantizing the encoded residual error features, and transmitting the residual error features as additional information, and an audio decoding apparatus for post-processing received additional information using a neural network, thereby providing backward compatibility with an existing codec and capable of improving sound quality of an audio signal decoded with the existing codec, and a method therefor.

In addition, example embodiments provide an apparatus and method for performing end-to-end deep learning for joint training a deep learning model that encodes a residual error feature vector in an additional information encoder, a deep learning model that restores the residual error feature vector in an additional information decoder, and a deep learning model that estimates a feature vector of an original signal in a post-processing processor, thereby capable of preventing errors of the additional information encoder, the additional information decoder, and the post-processing processor using the deep learning models from being sequentially accumulated.

According to an aspect, there is provided an audio encoding method including encoding an original signal to output a bitstream of a main codec; decoding the bitstream of the main codec, determining a residual error feature vector from a feature vector of a decoded signal and a feature vector of the original signal, and encoding the residual error feature vector and outputting a bitstream of additional information.

The outputting of the additional information bitstream of the audio encoding method according to the aspect may include mapping the residual error feature vector to a latent space, allocating and encoding the residual error feature vector mapped to the latent space as a code vector for vector quantization, and quantizing the encoded residual error feature vector to output the additional information bitstream.

An additional information encoder configured to encode the residual error feature vector of the audio encoding method according to the aspect may be trained according to a loss function determined according to a loss due to encoding of the additional information encoder, a loss due to vector quantization of an additional information decoder configured to decode the additional information bitstream, and a difference between the feature vector of the original signal and a feature vector of the original signal estimated from the bitstream of the main codec and the bitstream of the additional information.

The audio encoding method according to the aspect may further include training an additional information encoder configured to encode the residual error feature vector together with an additional information decoder configured to decode the additional information bitstream and a post-processing processor configured to estimate a feature vector of the original signal based on the bitstream of the main codec and the bitstream of the additional information.

The training of the audio encoding method according to the aspect may include training the additional information encoder, the additional information decoder, and the post-processing processor using a loss function based on a mean squared error (MSE) function and a loss function of a vector quantized variational auto-encoder (VQ-VAE).

The audio encoding method according to the aspect may further include extracting the feature vector of the decoded signal from acoustic features included in the decoded signal, and extracting the feature vector of the original signal from acoustic features included in the original signal.

According to another aspect, there is provided an audio decoding method including receiving a bitstream of a main codec and a bitstream of additional information, decoding the bitstream of the main codec, extracting a feature vector of a decoded signal from acoustic features included in the decoded signal, restoring a residual error feature vector by decoding the bitstream of the additional information, and estimating a feature vector of an original signal from the feature vector of the decoded signal and the residual error feature vector.

The estimating of the feature vector of the original signal of the audio decoding method according to the aspect may include estimating the feature vector of the original signal by combining the feature vector of the decoded signal and the residual error feature vector.

The audio decoding method according to the aspect may further include transforming the estimated feature vector of the original signal into a time domain representation and outputting the transformed feature vector.

The audio decoding method according to the aspect may further include training an additional information decoder configured to decode the additional information bitstream and a post-processing processor configured to estimate the feature vector of the original signal based on the bitstream of the main codec and the bitstream of the additional information together with an additional information encoder configured to encode the residual error feature vector in an encoding apparatus.

According to another aspect, there is provided an audio encoding apparatus including a main codec encoder configured to encode an original signal and output a bitstream of a main codec, a main codec decoder configured to decode the bitstream of the main codec, and an additional information encoder configured to determine a residual error feature vector from a feature vector of a decoded signal and a feature vector of the original signal and encode the residual error feature vector to output a bitstream of additional information.

The additional information encoder of the audio encoding apparatus according to the aspect may be configured to map the residual error feature vector to the latent space, allocate and encode the residual error feature vector mapped to the latent space as a code vector for vector quantization, and quantize the coded residual error feature vector to output the additional information bitstream.

The additional information encoder of the audio encoding apparatus according to the aspect may be trained according to a loss function determined according to a loss due to encoding of the additional information encoder, a loss due to vector quantization of an additional information decoder, and a difference between the feature vector of the original signal and a feature vector of the original signal estimated from the bitstream of the main codec and the bitstream of the additional information.

The additional information encoder of the audio encoding apparatus according to the aspect may be trained together with an additional information decoder configured to decode the additional information bitstream and a post-processing processor configured to estimate a feature vector of the original signal based on the bitstream of the main codec and the bitstream of the additional information.

The additional information encoder of the audio encoding apparatus according to the aspect may be trained together with the additional information decoder and the post-processing processor using a loss function based on a mean squared error (MSE) function and a loss function of a vector quantized variational auto-encoder (VQ-VAE).

According to another aspect, there is provided an audio decoding apparatus including a main codec decoder configured to receive a bitstream of a main codec and decode the bitstream of the main codec, a feature extractor configured to extract a feature vector of a decoded signal from acoustic features included in the decoded signal, an additional information decoder configured to receive a bitstream of additional information and decode the bitstream of the additional information to restore a residual error feature vector, and a post-processing processor configured to estimate a feature vector of an original signal from the feature vector of the decoded signal and the residual error feature vector.

The post-processing processor of the audio decoding apparatus according to the aspect may estimate the feature vector of the original signal by combining the feature vector of the decoded signal and the residual error feature vector.

The post-processing processor of the audio decoding apparatus according to the aspect may transform the estimated feature vector of the original signal into a time domain representation and output the transformed feature vector.

The additional information decoder and the post-processing processor of the audio decoding apparatus according to the aspect may be trained together with an additional information encoder configured to encode the residual error feature vector to output the bitstream of the additional information in an encoding apparatus.

Additional aspects of example embodiments will be set forth in part in the description which follows and, in part, will be apparent from the description, or may be learned by practice of the disclosure.

According to example embodiments, an audio encoding apparatus encodes residual error features using a neural network, vector quantizes the encoded residual error features, and transmits the vector-quantized residual error features as additional information, and an audio decoding apparatus post-processes the received additional information using a neural network, thereby capable of providing backward compatibility with an existing codec and improving sound quality of an audio signal decoded with the existing codec.

Further, according to example embodiments, it is possible to prevent errors of an additional information encoder, an additional information decoder, and a post-processing processor using deep learning models from being sequentially accumulated by performing end-to-end deep learning for jointly training a deep learning model for encoding a residual error feature vector, a deep learning model for restoring the residual error feature vector, and a deep learning model for estimating a feature vector of an original signal.

Furthermore, according to example embodiments, it is possible to effectively train a code vector that quantizes a compressed latent vector to extract additional information for sound quality improvement in an audio encoding process by performing the end-to-end deep learning for jointly training the deep learning models.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3 is an example of performance evaluation for an output of an audio decoding apparatus according to an example embodiment;

DETAILED DESCRIPTION

Hereinafter, example embodiments will be described in detail with reference to the accompanying drawings. An audio encoding method and an audio decoding method according to an example embodiment may be performed by an audio encoding apparatus 110 and an audio decoding apparatus 120.

Figure 1:
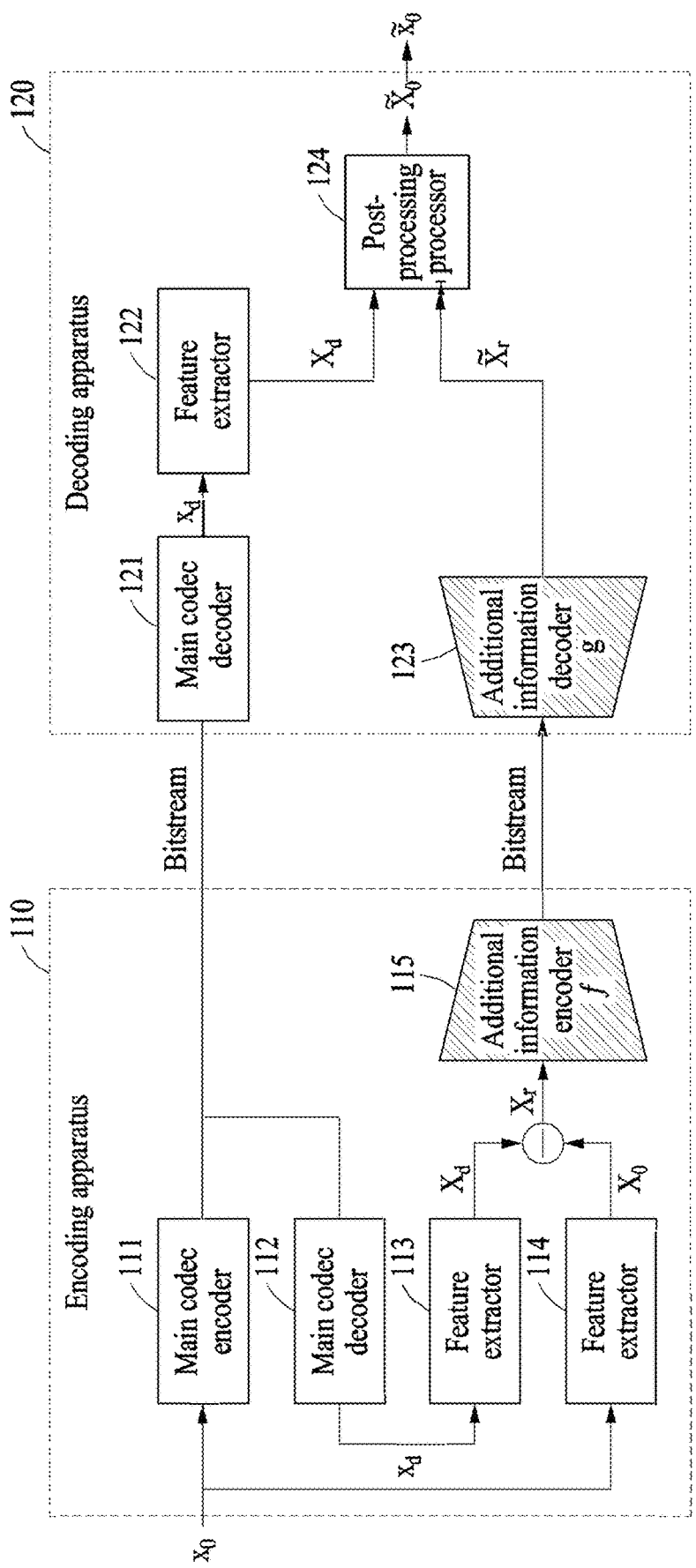
FIG. 1 is a diagram illustrating an audio encoding apparatus and an audio decoding apparatus according to an example embodiment.

FIG. 1 is a diagram illustrating an audio encoding apparatus and an audio decoding apparatus according to an example embodiment.

The audio encoding apparatus 110 may include a main codec encoder 111, a main codec decoder 112, a feature extractor 113, a feature extractor 114, and an additional information encoder 115, as shown in FIG. 1. In this case, the main codec encoder 111, the main codec decoder 112, the feature extractor 113, the feature extractor 114, and the additional information encoder 115 may be respective modules included in different processes or in one process.

The main codec encoder 111 may encode an original signal $x_o$ and output a bitstream of a main codec. For example, the main codec may be a legacy codec such as high-efficiency advanced audio coding (HE-AAC).

The main codec decoder 112 may decode the bitstream of the main codec and output a decoded signal $x_d$.

The feature extractor 113 may extract a feature vector $X_d$ of the decoded signal $x_d$ from acoustic features included in the decoded signal $x_d$.

The feature extractor 114 may extract a feature vector $X_o$ of the original signal $x_o$ from acoustic features included in the original signal $x_o$. For example, the feature extractor 113 and the feature extractor 114 may extract the feature vector $X_d$ and the feature vector $X_o$ using at least one of various types of acoustic features such as log power spectra (LPS).

The additional information encoder 115 may determine a residual error feature vector $X_r$ from the feature vector $X_d$ of the decoded signal $x_d$ and the feature vector $X_o$ of the original signal $x_o$. Further, the additional information encoder 115 may encode the residual error feature vector $X_r$ to output a bitstream of additional information. Here, the residual error feature vector $X_r$ may satisfy Equation (1).

$$X_r = X_o - X_d \quad \text{[Equation 1]}$$

In this case, the additional information encoder 115 may map the residual error feature vector $X_r$ to a latent space having a smaller dimension than the number of dimensions of the residual error feature vector. For example, the number of dimensions of the residual error feature vector $X_r$ input to the additional information encoder 115 may be 257, and the number of dimensions of the bitstream output from the additional information encoder 115 may be 32. In addition, the latent space may be a space expressing latent information inherent in observed data.

Then, the additional information encoder 115 may allocate and encode the residual error feature vector mapped to the latent space as a code vector for vector quantization. Next, the additional information encoder 115 may quantize the encoded residual error feature vector to output the additional information bitstream.

In this case, the additional information encoder 115 may be trained according to a loss function determined according to a loss due to the encoding and vector quantization of the additional information encoder 115, and a difference between the feature vector of the original signal and a feature vector of the original signal estimated by a post-processing processor 1240 from the bitstream of the main codec and the bitstream of the additional information. Here, the additional information encoder 115 may be trained together with an additional information decoder 123 and the post-processing processor 124. For example, the additional information encoder 115, the additional information decoder 123, and the post-processing processor 124 may perform joint training according to a loss function L represented by Equation (2).

$$\mathcal{L} = \|sg(f(X_r)) - e\|_2^2 + \|sg(e) - f(X_r)\|_2^2 + \|X_o - \tilde{X}_o\|_2^2. \quad \text{[Equation 2]}$$

In this case, $\|sg(f(X_r)) - e\|_2^2$ may be the loss due to the encoding and vector quantization for optimization of the additional information encoder 115, and $\|sg(e) - f(X_r)\|_2^2$ may be a loss due to decoding and vector quantization of the additional information decoder 123. Also, $\|X_o - \tilde{X}_o\|_2^2$ may be the difference in the post-processing processor 124 between the feature vector $X_o$ of the original signal and the feature vector $\tilde{X}_o$ of the original signal estimated by the post-processing processor 124. Also, the loss function may be trained using various optimization methods such as mean squared error (MSE).

In summary, the additional information encoder 115 may be trained together with the additional information decoder 123 and the post-processing processor 124 by using a loss function based on an MSE function and a loss function of a vector quantized variational auto-encoder (VQ-VAE). For example, the additional information encoder 115, the additional information decoder 123, and the post-processing processor 124 may be trained by using a loss function combining the MSE function (d functions of VQ-VAE ($\|sg(f(X_r)) - e\|_2^2$, $\|sg(e) - f(X_r)\|_2^2$) as in Equation 2.

As shown in FIG. 1, the audio decoding apparatus 120 may include a main codec decoder 121, a feature extractor 122, an additional information decoder 123, and the post-processing processor 124. In this case, the main codec decoder 121, the feature extractor 122, the additional information decoder 123, and the post-processing processor 124 may be respective modules included in different processes or in one process.

The main codec decoder 121 may receive the bitstream of the main codec from the main codec encoder 111 of the audio encoding apparatus 110. Further, the main codec decoder 121 may decode the received bitstream of the main codec and output a decoded signal $x_d$. Also, the main codec decoder 121 may operate in the same manner as the main codec decoder 112 of the audio signal encoding apparatus 110.

The feature extractor 122 may extract a feature vector $X_d$ of the signal $x_d$ decoded by the main codec decoder 121 from acoustic features included in the decoded signal $x_d$. Also, the feature extractor 122 may operate in the same manner as the feature extractor 112 of the audio signal encoding apparatus 110.

The additional information decoder 123 may receive the bitstream of the additional information from the additional information encoder 115 of the audio encoding apparatus 110. In addition, the additional information decoder 123 may restore the residual error feature vector by decoding the received bitstream of the additional information.

The post-processing processor 124 may estimate a feature vector of the original signal from the feature vector $X_d$ of the decoded signal $x_d$ and the residual error feature vector $\tilde{X}_r$ restored by the side information decoder 123. Further, the post-processing processor 124 may transform the estimated feature vector of the original signal into a time domain representation $\tilde{x}_o$ and output $\hat{x}_o$. In this case, the post-processing processor 124 may estimate the feature vector of the original signal by combining the feature vector $X_d$ and the residual error feature vector $\tilde{X}_r$.

The audio encoding apparatus 110 according to the present disclosure encodes residual error features using a neural network, vector quantizes the encoded residual error features, and transmits the vector-quantized residual error features as additional information, and the audio decoding apparatus 120 post-processes the received additional information using a neural network, thereby capable of providing backward compatibility with an existing codec and improving sound quality of an audio signal decoded with the existing codec.

Figure 2:
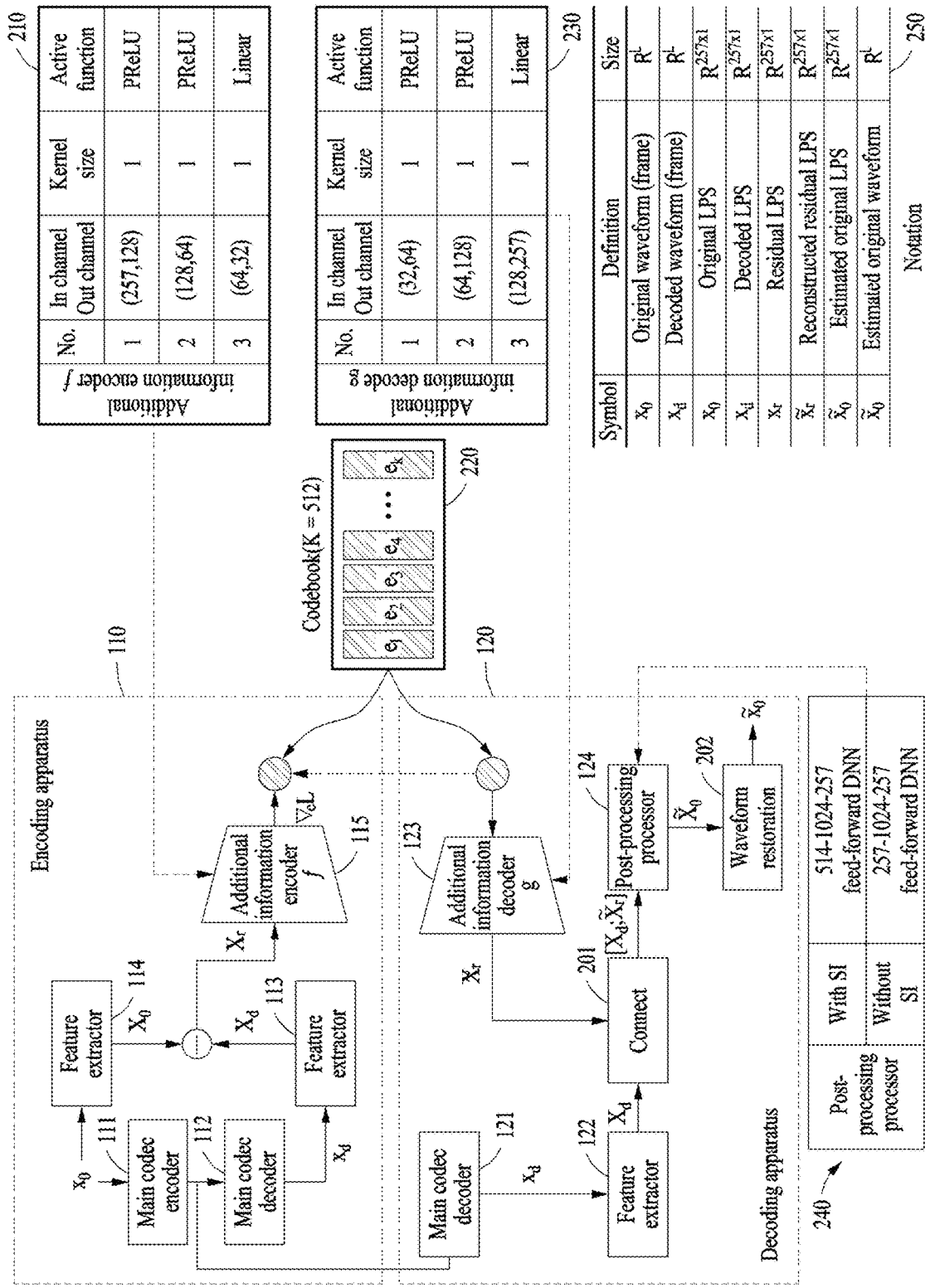
FIG. 2 is an example of operations of an audio encoding apparatus and an audio decoding apparatus according to an example embodiment.

FIG. 2 is an example of operations of an audio encoding apparatus and an audio decoding apparatus according to an example embodiment.

An original signal $x_o$ may be input to the main codec encoder 111 and the feature extractor 114 as shown in FIG. 2.

In this case, the main codec encoder 111 may encode the original signal $x_o$ and transmit the encoded original signal to the main codec decoder 112 of the audio encoding apparatus 120 and the main codec decoder 121 of the audio decoding apparatus 120.

In addition, each of the main codec decoder 112 and the main codec decoder 121 may decode received bitstream and output a decoded signal $x_d$.

The feature extractor 113 may extract a feature vector $X_d$ of the decoded signal $x_d$ from acoustic features included in the decoded signal $x_d$. Further, the feature extractor 114 may extract a feature vector $X_o$ of the original signal $x_o$ from acoustic features included in the original signal $x_o$.

In this case, the additional information encoder 115 may determine a residual error feature vector $X_r$, which is a difference between the feature vector $X_o$ of the original signal $x_o$ and the feature vector $X_d$ of the decoded signal $x_d$. In addition, the additional information encoder 115 may encode the residual error feature vector $X_r$ to output a bitstream of additional information. For example, a neural network used by the additional information encoder 115 to encode the residual error feature vector $X_r$ may be formed by a deep learning model having a structure 210. Also, an output code vector of the additional information encoder 115 may be allocated as a representative code vector of a VQ codebook 220. In this case, the representative code vector may be code vectors having the closest distance between vectors among vectors included in the VQ codebook 220. For example, a distance between vectors may be calculated using Euclidean distance or the like.

Then, the additional information encoder 115 may quantize the encoded residual error feature vector to output an additional information bitstream. In this case, the additional information bitstream may include a codebook index (code vector index) of the additional information. In addition, the additional information encoder 115 may transmit the codebook 220 and the additional information bitstream to the additional information decoder 123.

The additional information decoder 123 may restore the residual error feature vector by decoding the bitstream of the additional information received from the additional information encoder 115 of the audio encoding apparatus 110. For example, a neural network used by the additional information decoder 123 to decode the residual error feature vector $X_r$ may be formed by a deep learning model having a structure 230. In this case, the additional information decoder 123 may restore the residual error feature vector using a code vector of to the code book 220.

The feature extractor 122 may extract the feature vector $X_d$ of the decoded signal $x_d$ from acoustic features included in the signal $x_d$ decoded by the main codec decoder 121.

A concatenate operator 201 may input to the post-processing processor 124, which is a result $[X_d, \tilde{X}_r]$ of performing a concatenate operation on the feature vector $X_d$ and the residual error feature vector $X_r$ restored by the additional information decoder 123. Then, the post-processing processor 124 may estimate a feature vector of the original signal from $[X_d, X_r]$ using a deep learning module having a structure 240. Then, the post-processing processor 124 may output the estimated feature vector $\tilde{x}o$ of the original signal. In this case, a waveform restorer 202 may transform the estimated feature vector of the original signal $\tilde{x}_o$ into a time domain representation $\tilde{x}_o$ and output $\hat{x}_o$.

The audio encoding apparatus 110 and the audio decoding apparatus 120 may perform end-to-end deep learning for jointly training the deep learning model for encoding the residual error feature vector in the additional information encoder 115, the deep learning model for restoring the residual error feature vector in the additional information decoder 123, and the deep learning model for estimating the feature vector of the original signal in the post-processing processor 124, thereby capable of preventing errors of the additional information encoder 115, the additional information decoder 123, and the post-processing processor 124 using the deep learning models from being sequentially accumulated.

Further, the audio encoding apparatus 110 and the audio decoding apparatus 120 may perform end-to-end deep learning for jointly training the deep learning model having the structure 210, the deep learning model having the structure 230, and the deep learning module having the structure 240, thereby effectively training a code vector that quantizes a compressed latent vector to extract additional information for sound quality improvement in the audio encoding process. Specifically, the audio encoding apparatus 110 and the audio decoding apparatus 120 may optimize the additional information encoder 115, the additional information decoder 123, the codebook 220, and the post-processing processor 124 by training the deep learning model having the structure 210 to minimize the loss function of Equation 2, the deep learning model having the structure 230, and the deep learning module having the structure 240.

FIG. 3 is an example of performance evaluation for an output of an audio decoding apparatus according to an example embodiment.

Performance evaluation of an audio decoding apparatus using NeroAAC codec of MPEG-4 high-efficiency advanced audio coding (HE-AAC) v1 (NeroAAC), performance evaluation of an audio decoding apparatus with a post-processor added to the NeroAAC codec (+PP only), and performance evaluation of the audio decoding apparatus 120 using the NeroAAC codec as the main codec (Prop. (+0.6 kbps)) may be as shown in the upper table of FIG. 3. The table of FIG. 3 is an example of the performance measured using a standardized speech quality evaluation tool, ITU-T Recommendation P.862.2 wideband perceptual evaluation of speech quality (PESQ).

In addition, performance evaluation of an audio decoding apparatus using QAAC codec (QAAC), performance evaluation of an audio decoding apparatus with a post-processor added to the QAAC codec (+PP only), and performance evaluation of the audio decoding apparatus 120 using the QAAC codec as the main codec (Prop. (+0.6 kbps)) may be as shown in the lower table of FIG. 3.

As shown in FIG. 3, the audio encoding apparatus 110 and the audio decoding apparatus 120 according to an example embodiment may have a higher average PESQ score, despite an additionally used bit rate being about 0.6 kbps, than a method using only a post-processing module in addition to the main codec operating at a higher bit rate.

Figure 4:
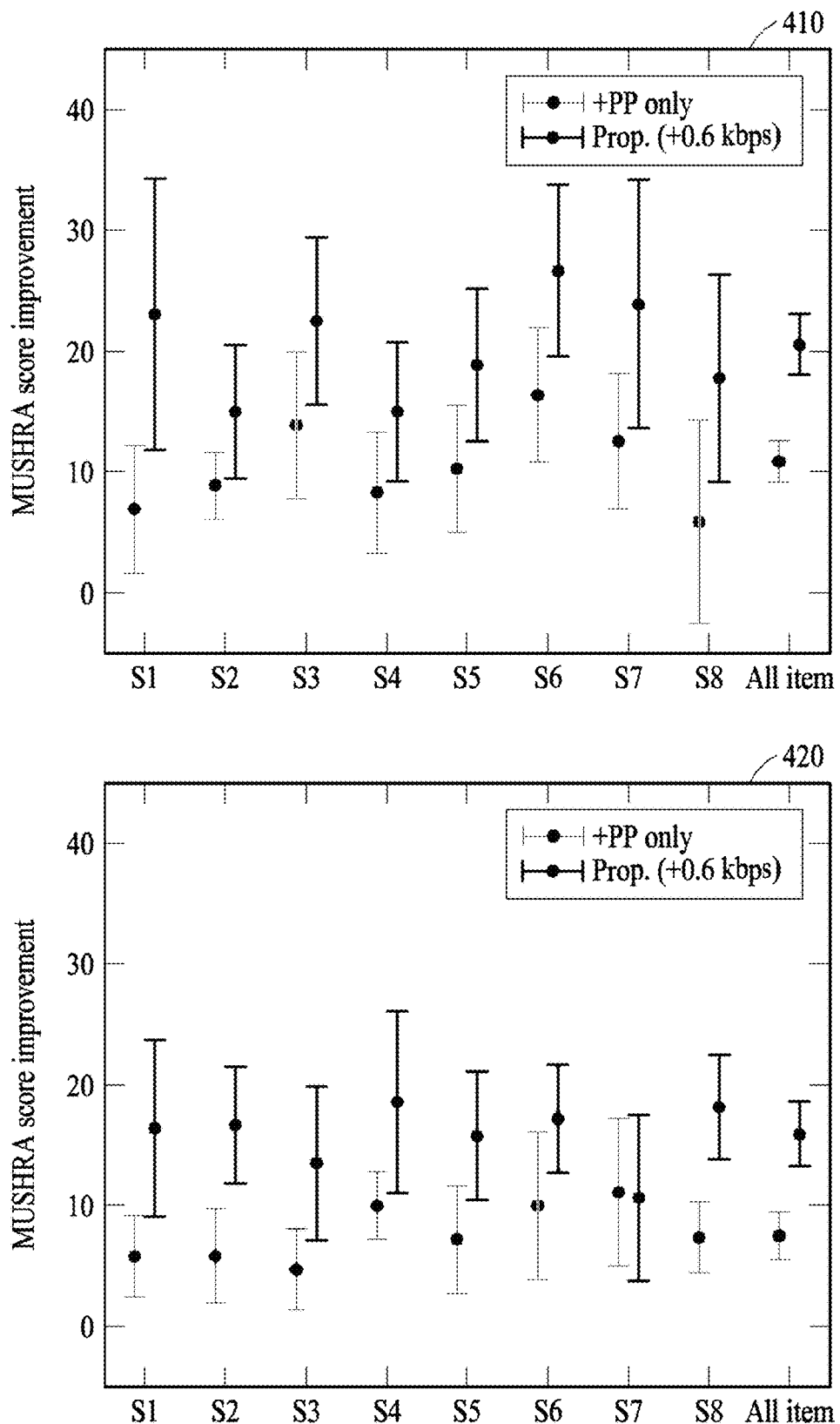
FIG. 4 is an example of evaluation of sound quality for an output of an audio decoding apparatus according to an example embodiment.

FIG. 4 is an example of evaluation of sound quality for an output of an audio decoding apparatus according to an example embodiment.

The graph 410 may show the extent to which the quality of a signal decoded by the audio decoding apparatus with the post-processor added to the NeroAAC codec is improved compared to a signal decoded by the audio decoding apparatus using the NeroAAC codec operated at 16 kbps (+PP only), and the extent to which the quality of a signal decoded by the audio decoding apparatus 120 using the NeroAAC codec as the codec is improved compared to the signal decoded by the audio decoding apparatus using the NeroAAC codec operated at 16 kbps (Prop. (+0.6 kbps)).

Further, the graph 420 may show the extent to which the quality of a signal decoded by the audio decoding apparatus with the post-processor added to the QAAC codec is improved compared to a signal decoded by the audio decoding apparatus using the QAAC codec operated at 16 kbps (+PP only), and the extent to which the quality of a signal decoded by the audio decoding apparatus 120 using the QAAC codec as the main codec is improved compared to the signal decoded by the audio decoding apparatus using the QAAC codec operated at 16 kbps (Prop. (+0.6 kbps)).

Here, the graph 410 and the graph 420 may be the results measured according to the MUltiple Stimuli with Hidden Reference and Anchor (MUSHRA) test, which is one of methods of performing a codec listening test to evaluate the quality of codec output signals. According to the graph 410 and the graph 420, the signal decoded by the audio decoding apparatus 120 according to an example embodiment, it can be seen that the signal decoded by the audio decoding apparatus 120 is improved by 9.73 points for NeroAAC and 7.93 for QAAC compared to the signal decoded by the audio decoding apparatus using only post-processing in addition to the main codec.

Figure 5:
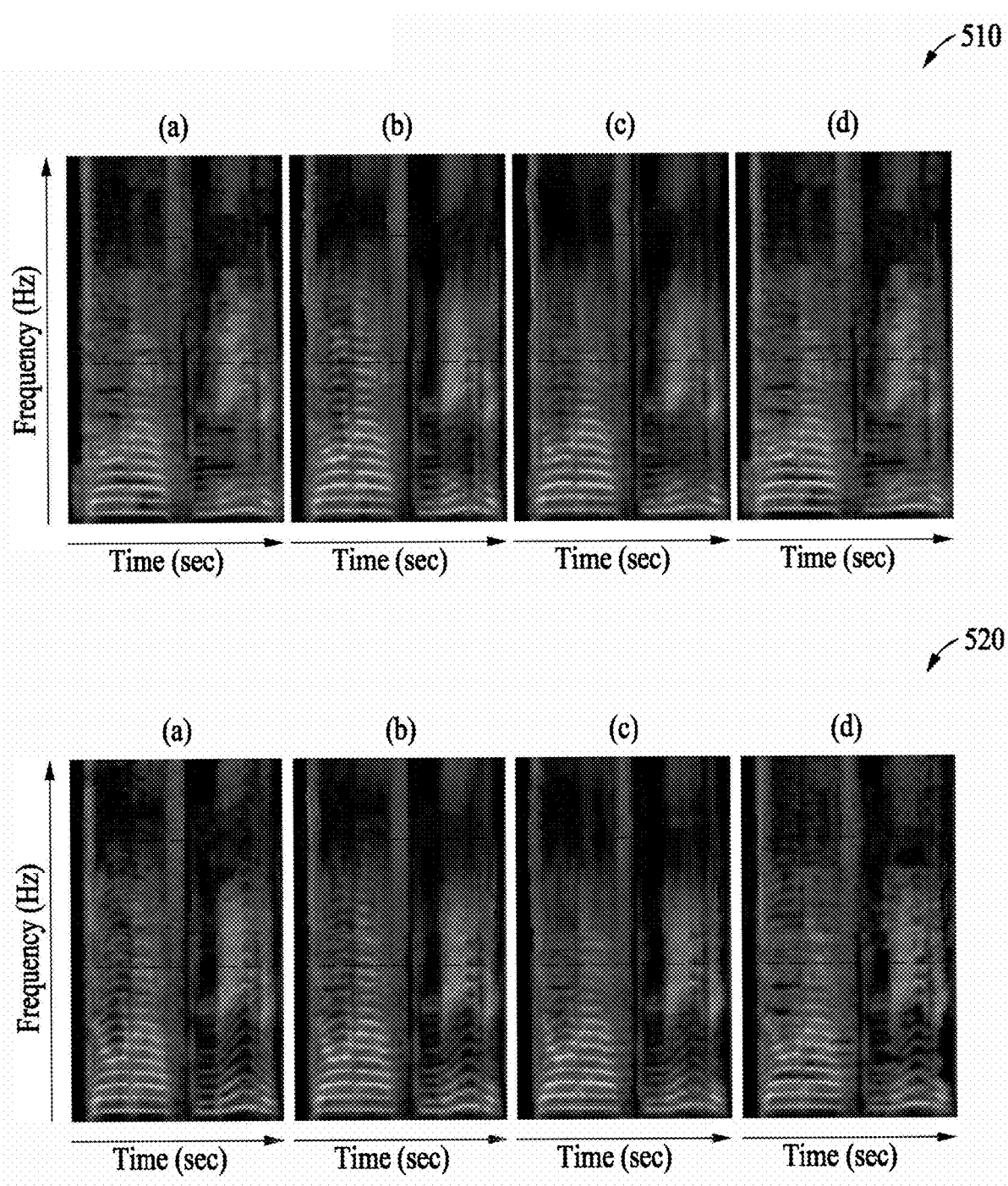
FIG. 5 is an example of spectrograms of a signal output by an audio decoding apparatus according to an example embodiment.

FIG. 5 is an example of spectrograms of a signal output by an audio decoding apparatus according to an example embodiment.

The spectrogram 510 of FIG. 5 shows the original signal (a), the signal decoded by the audio decoding apparatus 120 using the NeroAAC codec as the main codec (b), the signal decoded by the audio decoding apparatus with the post-processor added to the NeroAAC codec (c), and the signal decoded by an existing audio decoding apparatus using the NeroAAC codec (d).

Further, the spectrogram 520 of FIG. 5 shows the original signal (a), the signal decoded by the audio decoding apparatus 120 using the QAAC codec as the main codec (b), the signal decoded by the audio decoding apparatus with the post-processor added to the QAAC codec (c), and the signal decoded by an existing audio decoding apparatus using the QAAC codec (d).

According to the spectrogram 510 and the spectrogram 520, it can be seen that the high frequency band, which is not well restored in (c), is well restored in (b).

Figure 6:
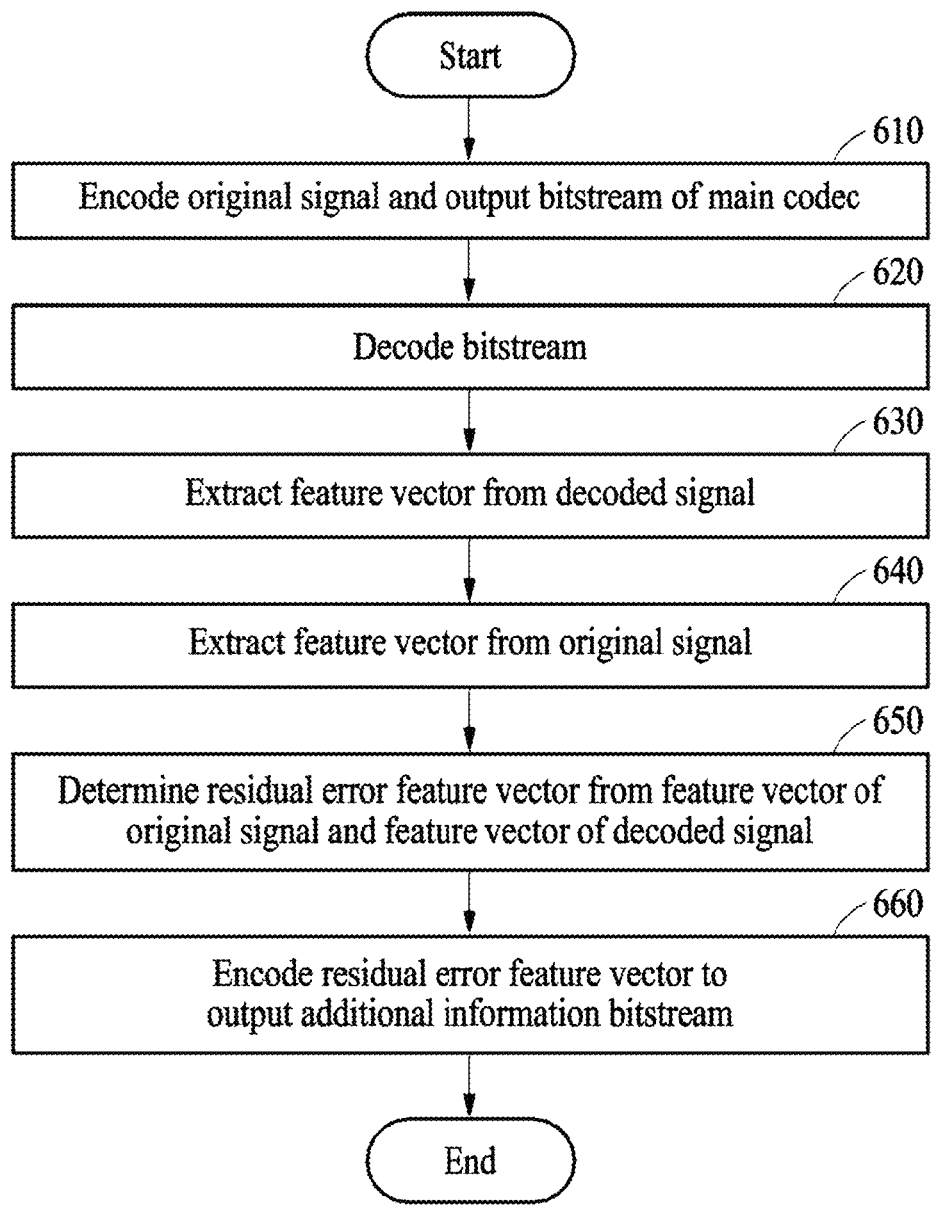
FIG. 6 is a flowchart illustrating an audio encoding method according to an example embodiment.

FIG. 6 is a flowchart illustrating an audio encoding method according to an example embodiment.

In operation 610, the main codec encoder 111 may encode an original signal $x_o$ to output a bitstream of the main codec.

In this case, the main codec encoder 111 may transmit the bitstream of the main codec to the audio decoding apparatus 120.

In operation 620, the main codec decoder 112 may decode the bitstream of the main codec output in operation 610 to output a decoded signal $x_d$.

In operation 630, the feature extractor 113 may extract, from the acoustic features included in the signal $x_d$ decoded in operation 620, a feature vector $X_d$ of the decoded signal $x_d$.

In operation 640, the feature extractor 114 may extract a feature vector $X_o$ of the original signal $x_o$ from the acoustic features included in the original signal $x_0$.

In operation 650, the additional information encoder 115 may determine a residual error feature vector $X_r$ from the feature vector $X_d$ of the decoded signal $x_d$ and the feature vector $X_o$ of the original signal $x_o$.

In operation 660, the additional information encoder 115 may encode the residual error feature vector $X_r$ to output a bitstream of additional information. In this case, the additional information encoder 115 may map the residual error feature vector $X_r$ to the latent space. Then, the additional information encoder 115 may encode the residual error feature vector mapped to the latent space by allocating the residual error feature vector as a code vector for vector quantization. Then, the additional information encoder 115 may quantize the encoded residual error feature vector to output an additional information bitstream.

Figure 7:
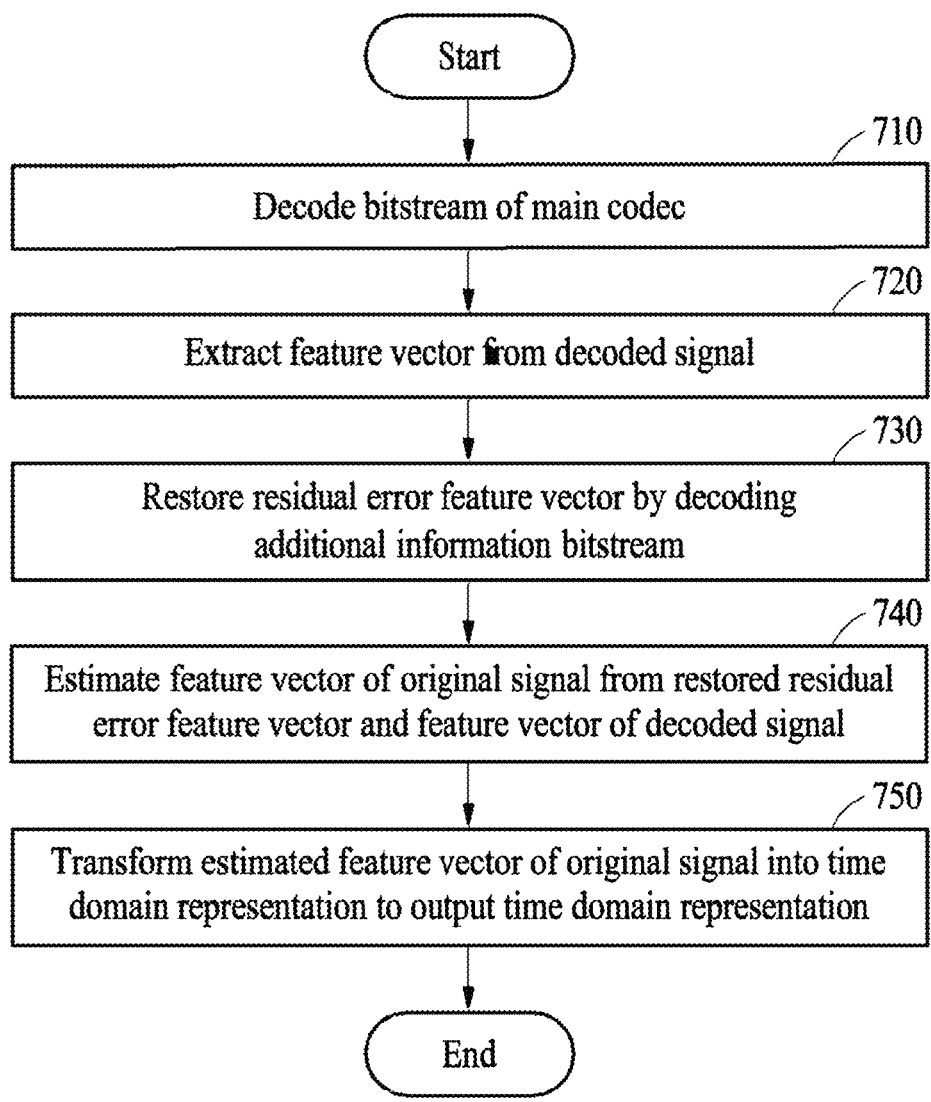
FIG. 7 is a flowchart illustrating an audio decoding method according to an example embodiment.

FIG. 7 is a flowchart illustrating an audio decoding method according to an example embodiment.

In operation 710, the main codec decoder 121 may receive the bitstream of the main codec from the main codec encoder 111 of the audio encoding apparatus 110. Further, the main codec decoder 121 may decode the received bitstream of the main codec to output a decoded signal $x_d$.

In operation 720, the feature extractor 122 may extract a feature vector $X_d$ of the decoded signal $x_d$ from the acoustic features included in the signal $x_d$ decoded in operation 710.

In operation 730, the additional information decoder 123 may receive the bitstream of the additional information from the additional information encoder 115 of the audio encoding apparatus 110. Further, the additional information decoder 123 may restore the residual error feature vector by decoding the received bitstream of the additional information.

In operation 740, the post-processing processor 124 may estimate a feature vector of the original signal from the feature vector $X_d$ of the decoded signal $x_d$ and the residual error feature vector $\tilde{X}_r$ restored by the additional information decoder 123. Here, the post-processing processor 124 may estimate the feature vector of the original signal by combining the feature vector $X_d$ and the residual error feature vector $\tilde{X}_r$.

In operation 750, the post-processing processor 124 may transform the estimated feature vector $\tilde{X}_o$ of the original signal into a time domain representation to $\tilde{x}_o$ output $\tilde{x}_o$.

The audio encoding apparatus 110 according to the present disclosure encodes residual error features using a neural network, vector quantizes the encoded residual error features, and transmits the vector-quantized residual error features as additional information, and the audio decoding apparatus 120 post-processes the received additional information using a neural network, thereby capable of providing backward compatibility with the existing codec and improving sound quality of an audio signal decoded with the existing codec.

Further, according to example embodiments, it is possible to prevent errors of the additional information encoder 115, the additional information decoder 123, and the post-processing processor 124 using the deep learning models from being sequentially accumulated by performing end-to-end deep learning for jointly training the deep learning model for encoding the residual error feature vector in the additional information encoder 115, the deep learning model for restoring the residual error feature vector in the additional information decoder 123, and the deep learning model for estimating the feature vector of the original signal in the post-processing processor 124.

In addition, according to example embodiments, it is possible to effectively train the code vector that quantizes the compressed latent vector to extract the additional information for sound quality improvement in the audio encoding process by performing end-to-end deep learning for jointly training the deep learning models.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded to from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An audio signal encoding method, the method comprising:
    outputting a bitstream of a main codec by encoding an original waveform;
    decoding the bitstream of the main codec;
    determining a residual error feature vector from a feature vector of a decoded waveform and a feature vector of the original waveform;
    outputting a bitstream of additional information by encoding the residual error feature vector; and
    training an additional information encoder configured to encode the residual error feature vector together with an additional information decoder configured to decode the additional information bitstream and a post-processing processor configured to estimate a feature vector of the original waveform based on the bitstream of the main codec and the bitstream of the additional information.

2. The method of claim 1, wherein the outputting of the additional information bitstream comprises:
   mapping the residual error feature vector to a latent space;
   allocating and encoding the residual error feature vector mapped to the latent space as a code vector for vector quantization; and
   quantizing the encoded residual error feature vector to output the additional information bitstream.

3. The method of claim 1, wherein an additional information encoder configured to encode the residual error feature vector is trained according to a loss function determined according to a loss due to encoding of the additional information encoder, a loss due to vector quantization of an additional information decoder configured to decode the additional information bitstream, and a difference between the feature vector of the original waveform and a feature vector of the original waveform estimated from the bitstream of the main codec and the bitstream of the additional information.

4. The method of claim 1, wherein the training comprises training the additional information encoder, the additional information decoder, and the post-processing processor using a loss function based on a mean squared error (MSE) function and a loss function of a vector quantized variational auto-encoder (VQ-VAE).

5. The method of claim 1, further comprising:
   extracting the feature vector of the decoded waveform from acoustic features included in the decoded waveform; and
   extracting the feature vector of the original waveform from acoustic features included in the original waveform.

6. An audio signal decoding method, the method comprising:
   receiving a bitstream of a main codec and a bitstream of additional information;
   decoding the bitstream of the main codec;
   extracting a feature vector of a decoded waveform from acoustic features included in the decoded waveform;
   restoring a residual error feature vector by decoding the bitstream of the additional information;
   estimating a feature vector of an original waveform from the feature vector of the decoded waveform and the residual error feature vector; and
   training an additional information decoder configured to decode the additional information bitstream and a post-processing processor configured to estimate the feature vector of the original waveform based on the bitstream of the main codec and the bitstream of the additional information together with an additional information encoder configured to encode the residual error feature vector in an encoding apparatus.

7. The method of claim 6, wherein the estimating of the feature vector of the original waveform comprises estimating the feature vector of the original waveform by combining the feature vector of the decoded waveform and the residual error feature vector.

8. The method of claim 6, further comprising:
   transforming the estimated feature vector of the original waveform into a time domain representation and outputting the transformed feature vector.

9. An audio signal encoding apparatus, the apparatus comprising:
   a main codec encoder configured to output a bitstream of a main codec by encoding an original waveform;
   a main codec decoder configured to decode the bitstream of the main codec; and
   an additional information encoder configured to determine a residual error feature vector from a feature vector of a decoded waveform and a feature vector of the original waveform and output a bitstream of additional information by encoding the residual error feature vector,
   wherein the additional information encoder is trained together with an additional information decoder configured to decode the additional information bitstream and a post-processing processor configured to estimate a feature vector of the original waveform based on the bitstream of the main codec and the bitstream of the additional information.

10. The apparatus of claim 9, wherein the additional information encoder is configured to map the residual error feature vector to the latent space, allocate and encode the residual error feature vector mapped to the latent space as a code vector for vector quantization, and quantize the coded residual error feature vector to output the additional information bitstream.

11. The apparatus of claim 9, wherein the additional information encoder is trained according to a loss function determined according to a loss due to encoding of the additional information encoder, a loss due to vector quantization of an additional information decoder, and a difference between the feature vector of the original waveform and a feature vector of the original waveform estimated from the bitstream of the main codec and the bitstream of the additional information.

12. The apparatus of claim 9, wherein the additional information encoder is trained together with the additional information decoder and the post-processing processor using a loss function based on a mean squared error (MSE) function and a loss function of a vector quantized variational auto-encoder (VQ-VAE).

* * * * *